(12) United States Patent
Okazaki (10) Patent No.: US 9,085,091 B2
(45) Date of Patent: Jul. 21, 2015

(54) PRODUCTION METHOD OF CERAMIC HONEYCOMB STRUCTURE

(75) Inventor: Shunji Okazaki, Miyako-gun (JP)

(73) Assignee: HITACHI METALS, LTD., Tokyo (JP)

( * ) Notice: Subject to any disclaimer, the term of this patent is extended or adjusted under 35 U.S.C. 154(b) by 236 days.

(21) Appl. No.: 13/816,845

(22) PCT Filed: Aug. 19, 2011

(86) PCT No.: PCT/JP2011/068803
§ 371 (c)(1),
(2), (4) Date: Feb. 13, 2013

(87) PCT Pub. No.: WO2012/023617
PCT Pub. Date: Feb. 23, 2012

(65) Prior Publication Data
US 2013/0140742 A1    Jun. 6, 2013

(30) Foreign Application Priority Data
Aug. 19, 2010 (JP) .................. 2010-183685

(51) Int. Cl.
*C04B 35/195* (2006.01)
*B28B 11/24* (2006.01)
(Continued)

(52) U.S. Cl.
CPC .......... *B28B 11/241* (2013.01); *B01D 46/2474* (2013.01); *C04B 35/195* (2013.01); *C04B 38/0006* (2013.01); *C04B 38/0645* (2013.01); *B01D 46/2429* (2013.01); *B01D 46/2466* (2013.01); *B01D 2046/2433* (2013.01); *C04B 2111/00793* (2013.01); *C04B 2235/3206* (2013.01); *C04B 2235/3217* (2013.01);
(Continued)

(58) Field of Classification Search
USPC ................................. 264/630, 631
See application file for complete search history.

(56) References Cited

U.S. PATENT DOCUMENTS 7,442,425 B2   10/2008   Fu et al.
7,723,250 B2    5/2010   Hayashi et al.
(Continued)

FOREIGN PATENT DOCUMENTS

CN    1088148 A    6/1994
CN    1856398 A   11/2006
(Continued)

OTHER PUBLICATIONS

International Search Report of PCT/JP2011/068803 dated Nov. 15, 2011.
(Continued)

*Primary Examiner* — Joseph S Del Sole
*Assistant Examiner* — Russell Kemmerle, III
(74) *Attorney, Agent, or Firm* — Sughrue Mion, PLLC (57) ABSTRACT

A method for producing a ceramic honeycomb structure having a large number of paths partitioned by porous cell walls, the cell walls having thickness of 0.17-0.45 mm and porosity of 40% or more, comprising the steps of preparing a moldable material comprising a ceramic material powder, a binder, a pore-forming material and water, extruding the moldable material to form a honeycomb-shaped green body, and drying and sintering the green body, the pore-forming material having a melting point of 40-110° C., being solid in the moldable material, and being melted in the drying step so that 25% or more thereof is removed from the green body in the drying step.

7 Claims, 2 Drawing Sheets

(51) Int. Cl.
*C04B 38/00* (2006.01)
*C04B 38/06* (2006.01)
*B01D 46/24* (2006.01)
*C04B 111/00* (2006.01)

(52) U.S. Cl.
CPC ... *C04B2235/349* (2013.01); *C04B 2235/3418* (2013.01); *C04B 2235/606* (2013.01); *C04B 2235/6562* (2013.01); *C04B 2235/6565* (2013.01); *C04B 2235/96* (2013.01); *F01N 2330/06* (2013.01); *F01N 2330/30* (2013.01)

(56) References Cited

U.S. PATENT DOCUMENTS

| | | | |
|---|---|---|---|
| 7,914,874 | B2 | 3/2011 | Henry et al. |
| 8,697,222 | B2 * | 4/2014 | Fu et al. ............ 428/116 |
| 2004/0161596 | A1 * | 8/2004 | Taoka et al. ............ 428/304.4 |
| 2005/0069469 | A1 * | 3/2005 | Fu et al. ............ 422/177 |
| 2005/0181197 | A1 * | 8/2005 | Masuyama et al. ........ 428/304.4 |
| 2006/0003143 | A1 | 1/2006 | Uchida et al. |
| 2007/0105707 | A1 * | 5/2007 | Ichikawa ............ 501/141 |
| 2007/0225149 | A1 * | 9/2007 | Hayashi et al. ............ 501/80 |
| 2007/0265161 | A1 | 11/2007 | Gadkaree et al. |
| 2008/0124516 | A1 | 5/2008 | Noguchi et al. |
| 2009/0041976 | A1 * | 2/2009 | Fu et al. ............ 428/116 |
| 2009/0057939 | A1 | 3/2009 | Henry et al. |
| 2009/0065982 | A1 * | 3/2009 | Morimoto et al. ............ 264/628 |
| 2011/0033772 | A1 * | 2/2011 | Tucker et al. ............ 429/479 |
| 2011/0036080 | A1 * | 2/2011 | Beall et al. ............ 60/299 |
| 2011/0294650 | A1 * | 12/2011 | Fredholm et al. ............ 501/82 |

FOREIGN PATENT DOCUMENTS

| | | |
|---|---|---|
| CN | 1934055 A | 3/2007 |
| CN | 101808955 A | 8/2010 |
| EP | 0 353 523 A2 | 2/1990 |
| JP | 59-83972 A | 5/1984 |
| JP | 63-11562 A | 1/1988 |
| JP | 63-35460 A | 2/1988 |
| JP | 08-323123 A | 12/1996 |
| JP | 2004-142978 A | 5/2004 |
| JP | 2005-170709 A | 6/2005 |
| JP | 2010-001184 A | 1/2010 |
| WO | 2005/090263 A1 | 9/2005 |
| WO | 2009/027837 A2 | 3/2009 |

OTHER PUBLICATIONS

Chinese Office Action for Application No. 201180039841.8 dated Jan. 6, 2014.
Extended European Search Report for Application No. 11818257.5 dated Feb. 26, 2014.

* cited by examiner

PRODUCTION METHOD OF CERAMIC HONEYCOMB STRUCTURE

CROSS REFERENCE TO RELATED APPLICATIONS

This application is a National Stage of International Application No. PCT/JP2011/068803filed Aug. 19, 2011, the contents of which are incorporated herein by reference in their entirety.

FIELD OF THE INVENTION

The present invention relates to a method for producing a ceramic honeycomb structure used for a ceramic honeycomb filter for removing particulate matter from exhaust gases discharged from diesel engines, etc.

BACKGROUND OF THE INVENTION

Because exhaust gases discharged from diesel engines, etc. contain soot-based particulate matter (PM) and nitrogen oxides (NOx), which are likely to adversely affect humans and environment when discharged into the air, the development of technologies for reducing PM and NOx have been investigated. Thus, exhaust members of diesel engines, etc. are provided with PM-capturing filters and NOx-removing catalyst carriers.

Figure 1A:
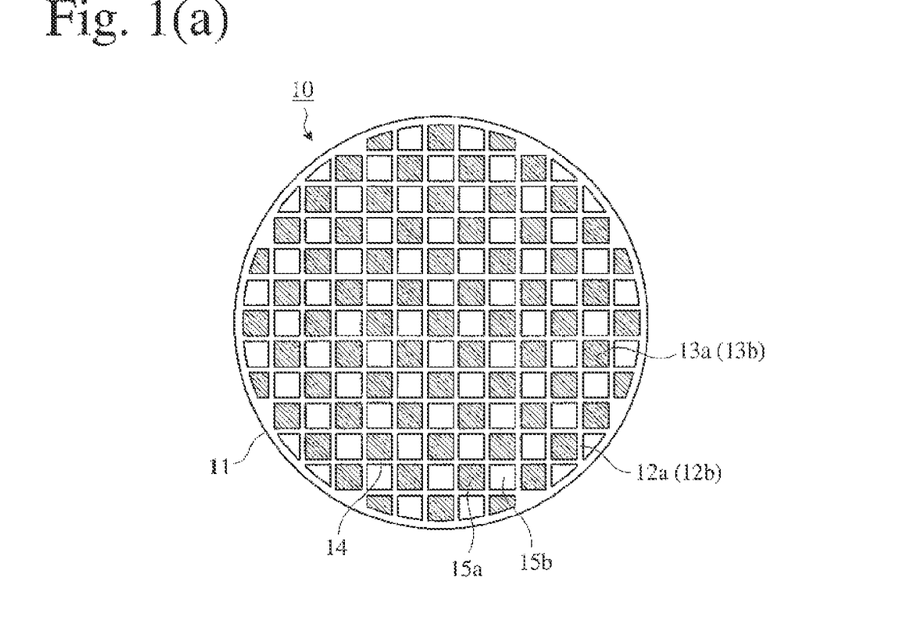
FIG. 1(a) is a front view showing one example of the ceramic honeycomb filters of the present invention.
Figure 1B:
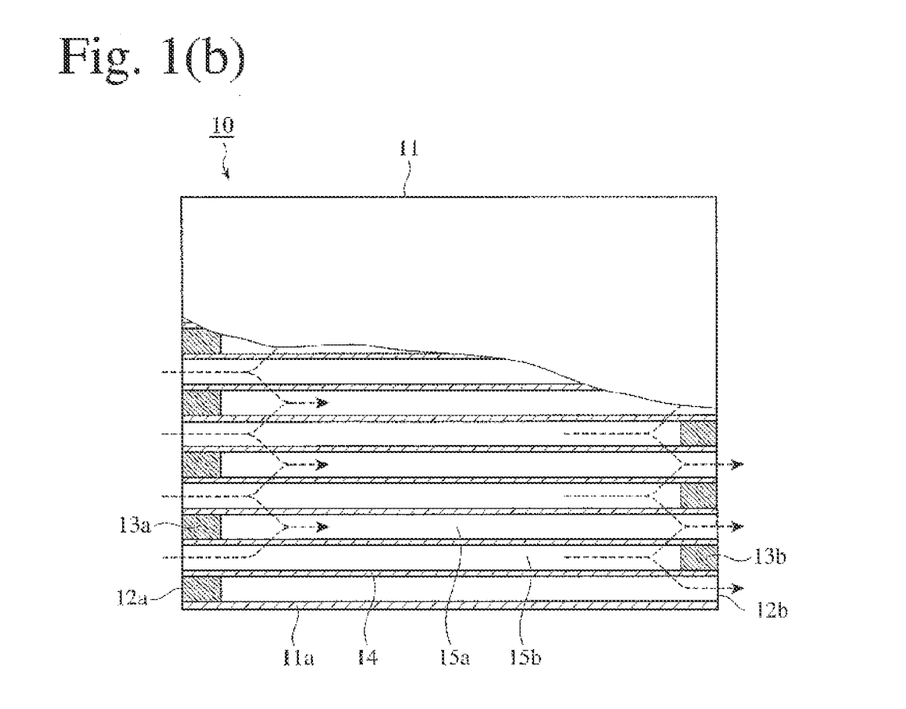
FIG. 1(b) is a cross-sectional view showing one example of the ceramic honeycomb filters of the present invention.

One example of ceramic honeycomb filters 10 for capturing PM in the exhaust gases of automobiles is shown in FIGS. 1(a) and 1(b). The ceramic honeycomb filter 10 comprises a ceramic honeycomb structure 11 comprising porous cell walls 14 defining a large number of outlet-side-sealed flow paths 15a and inlet-side-sealed flow paths 15b and a peripheral wall 11a, and upstream-side plugs 13a and downstream-side plugs 13b sealing the exhaust-gas-inlet-side end surface 12a and exhaust-gas-outlet-side end surface 12b of the outlet-side-sealed flow paths 15a and inlet-side-sealed flow paths 15a alternately in a checkerboard pattern. An exhaust gas (shown by arrows of dotted lines) flows into the paths 15b open at the end surface 12a, passes through the cell walls 14, and flows out of the paths 15a open at the end surface 12b. While passing through the cell walls 14, PM in the exhaust gas is captured by the cell walls 14, so that the exhaust gas is cleaned.

The ceramic honeycomb filter 10 is contained in a metal vessel (not shown) with the peripheral wall 11a of the ceramic honeycomb structure 11 held by members of metal mesh or ceramic mat, etc. to prevent it from moving during operation. As a catalyst carrier for removing NOx, a ceramic honeycomb structure 11 without upstream-side plugs 13a and downstream-side plugs 13b is used.

The ceramic honeycomb filter 10 as shown in FIGS. 1(a) and 1(b) is produced by the following steps: (a) a step of blending ceramic (for example, cordierite) materials, a binder, a pore-forming material, etc. to prepare a moldable material, (b) a step of extruding this moldable material, for example, by a screw-type extruder to form a honeycomb-structured green body, which is cut to a larger length than a target length, taking into consideration deformation in a drying or sintering step, (c) a step of drying and sintering the green body to form a cordierite ceramic honeycomb structure, (d) a step of machining end surfaces 12a, 12b of this ceramic honeycomb structure by a grinding tool such as a diamond cutter, a diamond saw, etc. to produce a honeycomb structure 11 having a predetermined length, and (e) a step of plugging the paths 15a, 15b at both end surfaces 12a, 12b of the honeycomb structure 11 with a plugging material in a checkerboard pattern, and drying and sintering the plugging material to obtain a honeycomb filter 10 having upstream-side plugs 13a and downstream-side plugs 13b.

The ceramic honeycomb filter is required to have low pressure loss. To provide the ceramic honeycomb structure with desired porosity, investigation has been conducted on the control of the particle sizes of ceramic materials, the use of organic pore-forming materials and the control of their amounts, etc. However, organic pore-forming materials and/or organic binders used for the ceramic honeycomb structure are burned in a sintering step, generating thermal stress affecting the honeycomb structure, thereby causing cracking.

To solve the above problems, JP 2004-142978 A discloses a method for producing a porous honeycomb structure by blending ceramic or metal aggregate particles, water, an organic binder, a pore-forming material, and colloid particles to prepare a moldable material, molding and drying the moldable material to a honeycomb-shaped green body, calcining the honeycomb green body, and sintering the resultant calcined body. JP 2004-142978 A describes that because the colloid particles are hardened by a dehydration condensation reaction, etc. at relatively low temperatures, they act as a reinforcing agent after burning off the organic binder, preventing the mechanical strength of the green body and the porous honeycomb structure from decreasing, so that the porous honeycomb structure is prevented from being cracked even when the rapid temperature elevation of a green body being sintered generates large thermal stress, due to the combustion of large amounts of the binder and the pore-forming material.

However, in the production method of a ceramic honeycomb structure described in JP 2004-142978 A, a large amount of colloid particles should be added such that they can act as a reinforcing agent, and excess colloid particles likely make it difficult to obtain a target ceramic composition. In addition, some types of organic pore-forming materials may be burned at lower temperatures than the dehydration condensation reaction temperature of colloid particles, making it difficult to completely avoid cracking due to the combustion of the organic pore-forming material. Particularly in the case of large honeycomb structures of 150 mm or more in outer diameter and 150 mm or more in length, to which a large amount of an organic pore-forming material is added to have cell walls having as high porosity as 40% or more, the reinforcing effect of the colloid particles is not sufficiently obtained.

JP 2010-001184 A discloses a method for sintering aluminum titanate using a thermoplastic resin having a thermal decomposition start temperature of 400° C. or lower as a pore-forming material, in which a low-oxygen atmosphere having an oxygen concentration of 2% or less is kept from a start temperature to an oxygen-introducing temperature of 1100° C. or lower in a step of heating a honeycomb green body to a sintering temperature, and oxygen is introduced at temperatures equal to or higher than the oxygen-introducing temperature, such that the oxygen concentration is higher than 2%. JP 2010-001184 A describes that when temperature elevation starts in the low-oxygen atmosphere, only an endothermic reaction of decomposing the resin occurs, providing no thermal stress due to heat generation, so that high-quality exhaust gas filters free from sintering cracking can be formed at high productivity without taking much time for sintering.

In the production method of a ceramic honeycomb structure described in JP 2010-001184 A, however, it is difficult to completely suppress cracking due to the combustion of the organic pore-forming material, for example, when a large amount of an organic pore-forming material is added to obtain cell walls having as high porosity as 40% or more in a large honeycomb structure of 150 mm or more in outer diameter and 150 mm or more in length. Because an additional apparatus for sintering in a low-oxygen atmosphere is used, large investment for the production is needed. In addition, the complete decomposition of some types of organic pore-forming materials in a low-oxygen atmosphere likely takes time to some extent, needing a long sintering time.

JP 08-323123 A discloses a method for producing an exhaust gas filter comprising molding a moldable ceramic material containing an ethylenic resin softened at 120° C. or lower as a pore-forming material, drying the resultant green body around a temperature at which the pore-forming material is softened, and sintering it. It describes that the softening of the pore-forming material during drying makes a high-fluidity pore-forming material exist more on the cell wall surfaces than in the cell walls, thereby providing larger pores on the cell wall surfaces than those in the cell walls after sintering, and that therefore, even the pore-forming material added in a small amount can provide the exhaust gas filter with practical pressure loss performance.

However, the production method of a ceramic honeycomb structure described in JP 08-323123 A is to control the diameters of pores on the cell wall surfaces, and most of the pore-forming material remains at the time of sintering though softened during drying. Accordingly, it fails to solve the problem of cracking by thermal stress generated by the combustion of the pore-forming material.

Particularly when a large amount of an organic pore-forming material is added to obtain cell walls having as high porosity as 40% or more in large honeycomb structures of 150 mm or more in outer diameter and 150 mm or more in length, it is not easy to suppress cracking due to the combustion of the organic pore-forming material, so that new improvements are desired.

OBJECT OF THE INVENTION

An object of the present invention is to provide a method capable of producing a ceramic honeycomb structure by sintering a honeycomb green body comprising a pore-forming material and an organic binder, with cracking drastically reduced during sintering.

DISCLOSURE OF THE INVENTION

As a result of intensive research in view of the above object, the inventor has paid attention to the fact that cracking occurs due to thermal stress generated by the combustion of a pore-forming material during sintering, finding that cracking can be extremely reduced by melting away the pore-forming material from the extruded honeycomb-shaped green body without burning at lower temperatures than its combustion temperature. The present invention has been completed based on such finding.

Thus, the method of the present invention for producing a ceramic honeycomb structure having a large number of paths partitioned by porous cell walls, the cell walls having a thickness of 0.17-0.45 mm and porosity of 40% or more, comprises the steps of preparing a moldable material comprising a ceramic material powder, a binder, a pore-forming material and water;

extruding the moldable material to form a honeycomb-shaped green body; and drying and sintering the green body, the pore-forming material having a melting point of 40-110° C., being solid in the moldable material, and being melted in the drying step, so that 25% or more of the pore-forming material added is removed from the green body in the drying step.

The pore-forming material is preferably a powdery polyalcohol aliphatic acid ester.

It is preferable that the pore-forming material has a median diameter D50 of 10-200 μm, the value of the formula of (D90−D10)/D50, wherein D10 and D90 respectively represent the diameters of particles whose cumulative volumes (cumulative values of the volumes of particles up to particular diameters) correspond to 10% and 90% of the total volume of the particles, being 1-1.5; and that the amount of the pore-forming material added is more than 6% and 30% or less by mass of the ceramic material powder.

The drying step is preferably conducted with microwaves and/or hot air applied to the green body.

In the above drying step, the molten pore-forming material is preferably removed by air blow.

The green body is preferably subject to a centrifugal force to remove the molten pore-forming material during or after drying.

DESCRIPTION OF THE PREFERRED EMBODIMENTS

[1] Production Method

The method of the present invention for producing a ceramic honeycomb structure having a large number of paths partitioned by porous cell walls, the cell walls having a thickness of 0.17-0.45 mm and porosity of 40% or more, comprises the steps of preparing a moldable material comprising a ceramic material powder, a binder, a pore-forming material and water, extruding the moldable material to form a honeycomb-shaped green body, and drying and sintering the green body, the pore-forming material having a melting point of 40-110° C., being solid in the moldable material, and being melted in the drying step, so that 25% or more of the pore-forming material added is removed from the green body in the drying step.

(1) Pore-Forming Material

The pore-forming material should be in a solid form in the moldable material. Because the temperature of blending and molding the moldable material is usually suppressed to about 30° C. or lower, the pore-forming material having a melting point of 40° C. or higher is used. Lest that the pore-forming material is dissolved in the moldable material, it is preferably insoluble in water and an organic binder used. Being solid, the pore-forming material keeps its shape in the extrudate, contributing to the formation of a porous body having as high porosity as 40% or more.

The above pore-forming material having a melting point of 40° C. or higher is melted away from the cell walls together with water in the drying step for evaporating water from the green body, so that at least 25% of the pore-forming material added is removed from the green body. Upon completion of drying, water does not evaporate from the green body any more, and the melting away of the pore-forming material stops. With 25% or more of the pore-forming material removed from the green body during drying, organic materials remaining in the green body, which is put in the sintering step, are the organic binder and the pore-forming material (less than 75%) remaining in the drying step. Thus, the total amount of organic materials existing in the green body to be sintered is so small that little heat is generated by the combustion of the organic materials. It is thus possible to suppress thermal stress due to the combustion of the organic materials, which is applied to the honeycomb structure, resulting in a low cracking ratio.

When the melting point of the pore-forming material is higher than 110° C., the pore-forming material is not easily melted away from the green body in the drying step, so that a higher percentage of the pore-forming material remains in the green body, resulting in larger thermal stress generated by the combustion of the pore-forming material during sintering, and thus more cracking. On the other hand, when the melting point of the pore-forming material is lower than 40° C., the pore-forming material is melted by heat generated during the blending and extruding of the moldable material, so that it cannot keep its shape in the green body, failing to form a porous body having as high porosity as 40% or more. The melting point of the pore-forming material is preferably 45-100° C.

It is preferable that the pore-forming material is hardly soluble in water and an organic binder used such that it is not dissolved in the moldable material, that it is easily melted in the drying step, that it has low viscosity after melting, and that it is easily removed from the green body. Particularly preferable are polyalcohol fatty acid esters such as glycerin-fatty acid esters, sorbitan-fatty acid esters, sucrose-fatty acid esters, etc. Among these compounds, it is preferable to use those having the above melting points. Because the polyalcohol fatty acid ester should have a pore-forming effect in the green body, it is preferably in the form of powder.

Because the polyalcohol fatty acid ester used as the pore-forming material is burned mostly at about 200-400° C. in the air, part of the pore-forming material remaining in the dried green body is removed by combustion during sintering. The above compound preferably has a 50% weight reduction temperature of about 250-330° C., its weight reduction ratio by evaporation at 350° C. being about 75-95%. The 50% weight reduction temperature is a temperature at which the mass of the compound is reduced to half in 50 minutes, and the weight reduction ratio by evaporation at 350° C. is a ratio (%) of weight reduction after the compound is kept at 350° C. for 65 minutes.

The pore-forming material preferably has a median diameter D50 of 10-200 µm, the value of the formula of (D90–D10)/D50, wherein D10 and D90 respectively represent the diameters of particles whose cumulative volumes (cumulative values of the volumes of particles up to particular diameters) correspond to 10% and 90% of the total volume of the particles, being 1-1.5. When the median diameter D50 of the pore-forming material is less than 10 µm, smaller pores are formed, so that the cell walls do not have sufficient permeability. With cell walls having insufficient permeability, the ceramic honeycomb filter has low pressure loss performance. On the other hand, when the median diameter of the pore-forming material exceeds 200 µm, the honeycomb structure has too large pore diameters, failing to keep sufficient strength, and resulting in poor PM-capturing performance.

The median diameter of the pore-forming material is preferably 35-180 µm. The median diameter of the pore-forming material is a diameter of particles whose cumulative volume corresponds to 50% of the total volume in a particle size distribution measured by a particle size distribution meter (Microtrack MT3000 available from Nikkiso Co., Ltd.).

With the value of the formula of (D90–D10)/D50 being 1.0-1.5, there are few coarser particles and finer particles in the pore-forming material, so that less shrinkage and collapse of pores formed in the drying step occur in the sintering step, with fewer coarse pores. As a result, the cell walls have high permeability with high strength.

The amount of the pore-forming material added is preferably more than 6% and 30% or less by mass, based on the ceramic material powder. With such amount, the pore-forming material can exist in the extrudate with its shape kept, contributing to the formation of pores, and the pore-forming material melted in the drying step can be easily removed together with water from the green body when water is evaporated. Further, it provides high porosity to the cell walls of the ceramic honeycomb structure, securing good pressure loss performance for the ceramic honeycomb filter. When the amount of the pore-forming material added is 6% or less by mass of the ceramic material powder, the honeycomb structure has small porosity, providing the honeycomb filter with large pressure loss. On the other hand, when the amount of the pore-forming material added exceeds 30% by mass of the ceramic material powder, the honeycomb structure has too large porosity, failing to keep enough strength, and resulting in low PM-capturing performance. The amount of the pore-forming material added is preferably 7-25% by mass.

(2) Drying

The honeycomb-shaped green body is preferably dried with microwaves and/or hot air. With microwaves and/or hot air, the entire honeycomb green body is so uniformly heated that part or all of the pore-forming material in the cell walls is melted. As a result, the pore-forming material is easily melted away from the cell walls. Hot air is preferably supplied through the paths of the honeycomb green body. In drying, microwaves may be applied with or without hot air, or they may be applied successively each for an arbitrary period of time.

Most of the pore-forming material melted out of the cell walls is removed from the green body, though part of the pore-forming material remains attached to the cell wall surfaces. When sintering is conducted with the pore-forming material attached to the cell wall surfaces, the remaining pore-forming material is burned, generating large thermal stress, so that cracking likely occurs in the sintered honeycomb structure. Accordingly, the pore-forming material remaining on the cell wall surfaces is preferably removed from the green body by air blow. This alleviates thermal stress generated by the combustion of the pore-forming material, thereby reducing cracking. The ejection pressure of the air blow is preferably 0.3 MPa or more.

To remove the molten pore-forming material from the green body during or after drying, the green body may be subject to a centrifugal force. In the process of melting the pore-forming material away from the green body together with evaporated water, a centrifugal force can remove not only the pore-forming material remaining on the cell wall surfaces, but also that remaining in the cell walls. The amount of the pore-forming material centrifugally removed from the green body is preferably 50% or more, more preferably 60% or more.

Thus, a centrifugal force applied to the green body during or after drying can reduce the amount of the pore-forming material remaining when sintering is conducted. As a result, thermal stress generated by the combustion of the pore-forming material can be reduced, further suppressing cracking. When the molten pore-forming material is centrifugally removed from the green body, the green body is preferably kept at a temperature equal to or higher than the melting point of the pore-forming material.

Figure 2:
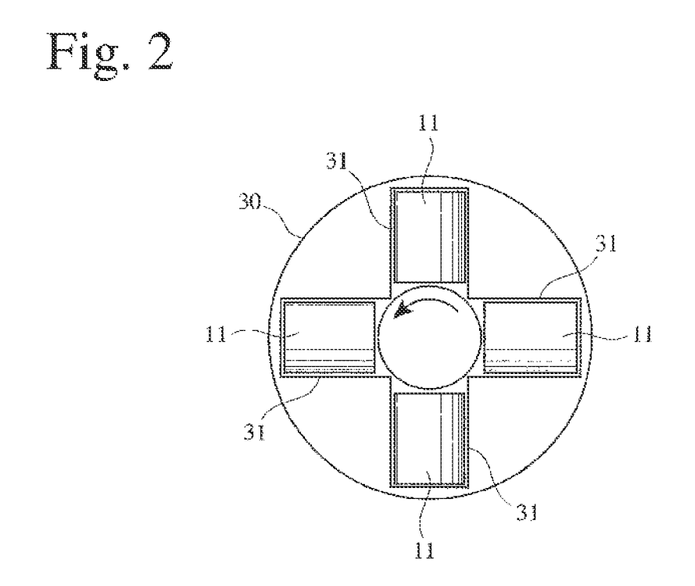
FIG. 2 is a schematic view showing a rotation apparatus used in the present invention.

For example, a rotation apparatus 30 as shown in FIG. 2 may be used to apply a centrifugal force to the green body. The rotation apparatus 30 comprises vessels 31 each containing the green body 11. With a heater (not shown) disposed in each vessel 31, the temperature inside the vessel 31 is preferably kept at a temperature (for example, about 130° C.), at which the pore-forming material is melted. Instead of the heater, the rotation apparatus 30 may be subject to hot air or microwaves. The dried green body 11 is put in the vessel 31 with its paths perpendicular to the rotation axis, and rotated at a high temperature under a centrifugal force to remove the molten pore-forming material from the green body. Centrifugal separation is conducted under the conditions that the green body 11 is not broken, preferably at about 100-500 rpm for about 5-30 minutes, though variable depending on the size of the green body 11. With a tray disposed on the bottom of the vessel 31 in the rotation apparatus 30, the removed pore-forming material can be collected.

(3) Production

The plasticized, moldable material is produced, for example, by mixing a cordierite-forming material comprising silica particles, talc particles, kaolin particles, alumina particles, etc. with a pore-forming material having a melting point of 40-110° C., a binder, etc. by a method without using pulverization media in a Henschel mixer, etc., and blending them with water by a method without excessive shearing in a kneader, etc. Mixing by the method without using pulverization media prevents silica particles (particularly amorphous silica particles) and the pore-forming material from being collapsed in the mixing step, so that the silica particles and the pore-forming material both having desired particle size distributions and shapes can exist in the extrudate as they are, resulting in a ceramic honeycomb filter having good pressure loss characteristics and PM-capturing efficiency.

The ceramic honeycomb structure is produced by extruding the plasticized, moldable material through a die by a known method to form a honeycomb-shaped green body, dry it by the above-described method, conducting centrifugal separation if necessary, melting the pore-forming material away from the green body, machining the end surfaces and periphery of the green body, etc. if necessary, and then sintering it. Sintering is conducted at controlled temperature elevation and cooling speeds in a continuous or batch furnace. When the ceramic material is a cordierite-forming material, it is kept at 1350-1450° C. for 1-50 hours, and cooled to room temperature after main cordierite crystals grow sufficiently. Particularly in the production of a large ceramic honeycomb structure having an outer diameter of 150 mm or more and a length of 150 mm or more (for example, an outer diameter of about 280 mm and a length of about 300 mm), the temperature elevation speed is preferably 0.2-10° C./hr in a temperature range (for example, 150-350° C.) in which the binder and the pore-forming material are decomposed, and 5-20° C./hr in a temperature range (for example, 1150-1400° C.) in which a cordierite-forming reaction proceeds, lest that the green body is cracked during sintering. The cooling is preferably conducted at a speed of 20-40° C./hr particularly in a range from 1400° C. to 1300° C.

The resultant honeycomb ceramic structure is plugged at ends or inside desired paths by a known method to provide a ceramic honeycomb filter. The plugs may be formed, after the green body is formed, dried by the above-described method, subject to centrifugal separation if necessary, deprived of the pore-forming material by melting, and machined at ends and periphery, etc. if necessary. The green body provided with plugs is then sintered to obtain a ceramic honeycomb filter.

[2] Ceramic Honeycomb Structure

The ceramic honeycomb structure produced by the method of the present invention has a large number of paths partitioned by porous cell walls, the cell walls having thickness of 0.17-0.45 mm and porosity of 40% or more. The ceramic honeycomb filter formed by such ceramic honeycomb structure has low pressure loss. When the cell walls have a thickness of less than 0.17 mm, they have low strength. On the other hand, when the cell walls have a thickness exceeding 0.45 mm, they have increased pressure loss. The thickness of the cell walls is preferably 0.2-0.35 mm. When the cell walls have porosity exceeding 70%, they have insufficient strength and low PM-capturing performance. The porosity of the cell walls is preferably 65% or less, more preferably 45-60%.

The ceramic honeycomb structure produced by the method of the present invention preferably has cell walls having a Darcy's coefficient of permeability of $2 \times 10^{-12}$ $m^2$ or more. With the Darcy's coefficient of permeability of $2 \times 10^{-12}$ $m^2$ or more, the cell walls have enough permeability, making it easy to discharge ash remaining after the combustion of PM captured by the ceramic honeycomb filter, thus preventing ash from being easily accumulated in the ceramic honeycomb filter. As a result, the cell walls of the ceramic honeycomb filter are resistant to melting. The Darcy's coefficient of permeability of the cell walls is preferably $2.5 \times 10^{-12}$ $m^2$ or more.

The present invention will be explained in more detail referring to Examples below without intention of restricting the present invention thereto.

EXAMPLE 1

Kaolin powder, talc powder, silica powder and alumina powder were mixed to obtain a cordierite-forming material powder having a chemical composition comprising 51% by mass of $SiO_2$, 35% by mass of $Al_2O_3$ and 14% by mass of MgO. This cordierite-forming material powder was fully mixed with 8% by mass of methylcellulose, a lubricant, and a powdery pore-forming material having the type, melting point, median diameter and [(D90−D10)/D50] shown in Table 1 in the amount shown in Table 1 in a dry state, and then blended with water to prepare a plasticized, moldable ceramic material. This moldable ceramic material was extruded, and cut to a predetermined length to obtain a honeycomb-structure green body.

The median diameter and [(D90−D10)/D50] of the pore-forming material were determined from the particle size distribution of pore-forming material particles, which was measured by a particle size distribution meter (Microtrack MT3000 available from Nikkiso Co., Ltd.). In the measured particle size distribution, the median diameter was defined as a diameter D50 of particles, at which the cumulative volume of particles was 50%. Further, a diameter D10 of particles at which the cumulative volume was 10%, and a diameter D90 of particles at which the cumulative volume was 90% were determined to calculate [(D90−D10)/D50].

Hot air at 80° C. was caused to pass through the paths of this honeycomb green body for 30 minutes to dry the green body. During drying, the pore-forming material melting from the green body was collected in a plate under a mesh on which the green body was placed. The removal ratio of the pore-forming material from the green body, which was a ratio of the amount of the pore-forming material removed to the amount of the pore-forming material added to the moldable material, was calculated from the amount (a) of the pore-forming material collected and the amount (b) of the pore-forming material added by the formula of [(a/b)×100] (%).

The dried green body was sintered in an air-atmosphere, sintering furnace to obtain a cordierite honeycomb structure having an outer diameter of 266.7 mm, a length of 304.8 mm, a cell wall thickness of 0.3 mm and a cell wall pitch of 1.5 mm. The sintering comprised temperature elevation at an average speed of 10° C./hr from room temperature to 150° C., 2° C./hr from 150° C. to 350° C., 20° C./hr from 350° C. to 1150° C., and 10° C./hr from 1150 to 1425° C., keeping at the highest temperature of 1425° C. for 24 hours, and cooling at an average speed of 30° C./hr from 1425° C. to 1300° C., and 80° C./hr from 1300° C. to 100° C.

EXAMPLES 2-6 and 10-16, and COMPARATIVE EXAMPLES 1-6

The ceramic honeycomb structures of Examples 2-4 and 10-16, and Comparative Examples 1-6 were produced in the same manner as in Example 1, except for changing the pore-forming materials as shown in Table 1, and the drying conditions described later.

Drying was conducted by microwave irradiation of 10 kW for 15 minutes in Examples 2-4 and 10-16; the above microwave irradiation with hot air at 80° C. for 15 minutes in Example 5; the above microwave irradiation for 5 minutes and then microwave irradiation with hot air at 80° C. for 10 minutes in Example 6; the above microwave irradiation for 3 minutes in Comparative Example 1; the above microwave irradiation for 5 minutes in Comparative Example 2; and the above microwave irradiation for 15 minutes in Comparative Examples 3-6.

EXAMPLES 7-9

Ceramic honeycomb structures were produced in the same manner as in Example 1 except for changing the pore-forming material and the drying conditions as shown in Table 1, and removing pore-forming materials remaining after the drying of the green bodies by centrifugal separation described below.

The centrifugal separation was conducted at 300 rpm for 10 minutes on the dried green body 11 contained in each vessel 31 in a rotating apparatus 30 shown in FIG. 2 with its paths perpendicular to the rotation axis, while keeping the temperature in the vessel 31 at 130° C. by a heater (not shown). The pore-forming material centrifugally separated from the green body was collected by a tray disposed on the bottom of the vessel 31, and its amount was used with the amount of a pore-forming material melted away during drying to calculate the pore-forming material removal ratio (%).

EXAMPLES 17-20

The ceramic honeycomb structures of Examples 17-20 were produced in the same manner as in Examples 2 and 5-7, except for blowing air at an ejection pressure of 0.3 MPa through the paths of the dried green body to remove pore-forming materials remaining on the cell wall surfaces. The amount of a pore-forming material removed by air blow was calculated by subtracting the mass (d) of the green body after air blow from the mass (c) of the green body before air blow. Namely, The removal ratio of a pore-forming material in Examples was calculated by the formula of [(a+c−d)/b]×100 (%), wherein a and b respectively represent the amount of a pore-forming material collected during drying and the amount of a pore-forming material added, as in Example 1.

The resultant ceramic honeycomb structures of Examples 1-20 and Comparative Examples 1-6 were evaluated with respect to porosity, a median diameter of pores, a Darcy's coefficient of permeability and a cracking ratio by the methods described below. The results are shown in Table 1.

Porosity

The porosity of cell walls was measured by mercury porosimetry. A test piece (10 mm×10 mm×10 mm) cut out of each ceramic honeycomb filter was set in a measurement cell of Autopore III available from Micromeritics, and the cell was evacuated. Thereafter, mercury was introduced into the cell under pressure. The relation between a pore diameter and a cumulative pore volume was determined from the relation between pressure and the volume of mercury intruded into pores in the test piece. The mercury-intruding pressure was 0.5 psi ($0.35 \times 10^{-3}$ kg/mm$^2$), and constants used for calculating the pore diameter from the pressure were a contact angle of 130°, and a surface tension of 484 dyne/cm. The porosity was calculated from the measured total pore volume, using 2.52 g/cm$^3$ as the true density of cordierite.

Median Diameter of Pores

From the relation between a pore diameter and a cumulative pore volume determined by the mercury porosimetry, the median diameter of pores was defined as a pore diameter at which the cumulative pore volume was 50%.

Darcy's Coefficient of Permeability

The Darcy's coefficient of permeability was determined as the maximum air permeability measured by Perm Automated Porometer (registered trademark) 6.0 available from Porous Materials, Inc., with the flow rate of air increasing from 30 cc/sec to 400 cc/sec.

Cracking Ratio

In each Example and Comparative Example, the cracking ratio was defined as a ratio of those cracked among 100 ceramic honeycomb structures continuously produced.

TABLE 1

| | | Pore-Forming Material | | | |
|---|---|---|---|---|---|
| No. | Type | Melting Point (° C.) | Median Diameter (μm) | (D90 − D10)/ D50 | Amount (% by mass) |
| Example 1 | Glycerin-Fatty Acid Ester | 70 | 50 | 1.2 | 10 |
| Example 2 | Glycerin-Fatty Acid Ester | 70 | 50 | 1.2 | 10 |
| Example 3 | Glycerin-Fatty Acid Ester | 70 | 95 | 1.2 | 10 |
| Example 4 | Glycerin-Fatty Acid Ester | 70 | 200 | 1.1 | 10 |
| Example 5 | Glycerin-Fatty Acid Ester | 70 | 50 | 1.2 | 10 |
| Example 6 | Glycerin-Fatty Acid Ester | 70 | 50 | 1.2 | 10 |
| Example 7 | Glycerin-Fatty Acid Ester | 70 | 50 | 1.2 | 10 |
| Example 8 | Glycerin-Fatty Acid Ester | 50 | 90 | 1.3 | 10 |

TABLE 1-continued

| No. | | | | | |
|---|---|---|---|---|---|
| Example 9 | Glycerin-Fatty Acid Ester | 110 | 90 | 1.3 | 10 |
| Example 10 | Glycerin-Fatty Acid Ester | 90 | 250 | 1.6 | 10 |
| Example 11 | Sorbitan-Fatty Acid Ester | 90 | 20 | 1.2 | 10 |
| Example 12 | Glycerin-Fatty Acid Ester | 70 | 50 | 1.2 | 2 |
| Example 13 | Glycerin-Fatty Acid Ester | 70 | 50 | 1.2 | 25 |
| Example 14 | Glycerin-Fatty Acid Ester | 70 | 50 | 1.2 | 35 |
| Example 15 | Glycerin-Fatty Acid Ester | 70 | 50 | 1.2 | 7 |
| Example 16 | Glycerin-Fatty Acid Ester | 70 | 50 | 1.2 | 15 |
| Example 17 | Glycerin-Fatty Acid Ester | 70 | 50 | 1.2 | 10 |
| Example 18 | Glycerin-Fatty Acid Ester | 70 | 50 | 1.2 | 10 |
| Example 19 | Glycerin-Fatty Acid Ester | 70 | 50 | 1.2 | 10 |
| Example 20 | Glycerin-Fatty Acid Ester | 70 | 50 | 1.2 | 10 |
| Comp. Ex. 1 | Glycerin-Fatty Acid Ester | 70 | 50 | 1.3 | 10 |
| Comp. Ex. 2 | Glycerin-Fatty Acid Ester | 70 | 50 | 1.3 | 10 |
| Comp. Ex. 3 | Glycerin-Fatty Acid Ester | 35 | 50 | 1.2 | 10 |
| Comp. Ex. 4 | Glycerin-Fatty Acid Ester | 120 | 50 | 1.2 | 10 |
| Comp. Ex. 5 | Foamed Resin | — | 50 | 2.0 | 8 |
| Comp. Ex. 6 | Graphite | — | 30 | 3.5 | 20 |

| No. | Drying Conditions | Air Blow | Centrifugal Separation | Removal Ratio (%) |
|---|---|---|---|---|
| Example 1 | Hot air at 80° C. for 30 minutes | No | No | 25 |
| Example 2 | Microwaves for 15 minutes | No | No | 35 |
| Example 3 | Microwaves for 15 minutes | No | No | 35 |
| Example 4 | Microwaves for 15 minutes | No | No | 45 |
| Example 5 | Hot air at 80° C. with microwaves for 15 minutes | No | No | 35 |
| Example 6 | Microwaves for 5 minutes + Hot air at 80° C. with microwaves for 10 minutes | No | No | 40 |
| Example 7 | Microwaves for 15 minutes | No | Yes | 60 |
| Example 8 | Microwaves for 15 minutes | No | Yes | 65 |
| Example 9 | Microwaves for 15 minutes | No | Yes | 55 |
| Example 10 | Microwaves for 15 minutes | No | No | 50 |
| Example 11 | Microwaves for 15 minutes | No | No | 50 |
| Example 12 | Microwaves for 15 minutes | No | No | 35 |
| Example 13 | Microwaves for 15 minutes | No | No | 35 |
| Example 14 | Microwaves for 15 minutes | No | No | 35 |
| Example 15 | Microwaves for 15 minutes | No | No | 35 |
| Example 16 | Microwaves for 15 minutes | No | No | 35 |
| Example 17 | Microwaves for 15 minutes | Yes | No | 50 |
| Example 18 | Hot air at 80° C. with microwaves for 15 minutes | Yes | No | 50 |
| Example 19 | Microwaves for 5 minutes + Hot air at 80° C. with microwaves for 10 minutes | Yes | No | 55 |
| Example 20 | Microwaves for 15 minutes | Yes | Yes | 65 |
| Comp. Ex. 1 | Microwaves for 3 minutes | No | No | 10 |
| Comp. Ex. 2 | Microwaves for 5 minutes | No | No | 20 |
| Comp. Ex. 3 | Microwaves for 15 minutes | No | No | 80 |
| Comp. Ex. 4 | Microwaves for 15 minutes | No | No | 20 |
| Comp. Ex. 5 | Microwaves for 15 minutes | No | No | 0 |
| Comp. Ex. 6 | Microwaves for 15 minutes | No | No | 0 |

| No. | Porosity (%) | Median Diameter of Pores (μm) | Darcy's Coefficient of Permeability ($\times 10^{-12}\,m^2$) | Cracking Ratio (%) |
|---|---|---|---|---|
| Example 1 | 46 | 20 | 2.1 | 4 |
| Example 2 | 47 | 20 | 2.2 | 3 |
| Example 3 | 50 | 25 | 2.5 | 3 |
| Example 4 | 54 | 29 | 3.0 | 2 |
| Example 5 | 48 | 21 | 2.6 | 3 |
| Example 6 | 47 | 21 | 2.6 | 2 |
| Example 7 | 54 | 26 | 2.7 | 1 |
| Example 8 | 55 | 27 | 2.8 | 1 |
| Example 9 | 55 | 27 | 2.8 | 1 |
| Example 10 | 56 | 33 | 3.5 | 2 |
| Example 11 | 45 | 18 | 1.9 | 1 |
| Example 12 | 40 | 19 | 0.9 | 2 |
| Example 13 | 59 | 29 | 3.4 | 3 |
| Example 14 | 68 | 31 | 4.8 | 5 |
| Example 15 | 43 | 20 | 2.0 | 2 |
| Example 16 | 52 | 25 | 2.5 | 2 |
| Example 17 | 47 | 20 | 2.2 | 2 |
| Example 18 | 48 | 21 | 2.6 | 2 |
| Example 19 | 47 | 21 | 2.6 | 2 |
| Example 20 | 54 | 26 | 2.7 | 1 |
| Comp. Ex. 1 | 50 | 23 | 2.1 | 20 |
| Comp. Ex. 2 | 51 | 22 | 2.3 | 12 |
| Comp. Ex. 3 | 30 | 15 | 0.5 | 1 |

TABLE 1-continued

| Comp. Ex. 4 | 50 | 23 | 1.8 | 7 |
| Comp. Ex. 5 | 62 | 27 | 1.7 | 8 |
| Comp. Ex. 6 | 48 | 15 | 0.5 | 30 |

It is clear from Table 1 that the ceramic honeycomb structures of Examples 1-20 within the present invention suffered little cracking and enjoyed good permeability. Particularly, the ceramic honeycomb structures of Examples 7-9, from which the pore-forming material was melted away by centrifugal separation after drying, had as extremely low a cracking ratio as 1% or less. In Examples 17-20, in which air blow was conducted after drying on Examples 2 and 5-7, the cracking ratio was further reduced.

On the other hand, the ceramic honeycomb structures of Comparative Examples 1 and 2, from which only 10% and 20% of pore-forming materials were respectively removed from the green bodies in the drying step, suffered as large cracking ratios as 20% and 12%, respectively, because of large thermal stress generated due to the combustion of the pore-forming materials during sintering.

The ceramic honeycomb structure of Comparative Example 3 using a pore-forming material having too low a melting point had as low porosity as 30%. The ceramic honeycomb structure of Comparative Example 4 using a pore-forming material having too high a melting point had as low a pore-forming material removal ratio as 20%, and as high a cracking ratio as 7%.

The ceramic honeycomb structure of Comparative Example 5 using a foamed resin not melted away during drying as the pore-forming material suffered as large a cracking ratio as 8%, because of thermal stress generated due to the combustion of the pore-forming material during sintering. The ceramic honeycomb structure of Comparative Example 6 using graphite as the pore-forming material suffered as extremely large a cracking ratio as 30%, because of large volume expansion generated when graphite was burned.

Effect of the Invention

Because the method of the present invention can reduce cracking due to a pore-forming material during the sintering of a ceramic honeycomb green body comprising the pore-forming material and an organic binder, it is particularly suitable for the production of ceramic honeycomb structures having cell walls with porosity of 40% or more, and as large as 150 mm or more in outer diameter and 150 mm or more in length.

What is claimed is:

1. A method for producing a ceramic honeycomb structure having a large number of paths partitioned by porous cell walls, said cell walls having a thickness of 0.17-0.45 mm and porosity of 40% or more, comprising the steps of
preparing a moldable material comprising a ceramic material powder, a binder, a pore-forming material and water;
extruding said moldable material to form a honeycomb-shaped green body; and
drying and sintering said green body,
said pore-forming material having a melting point of 40-110° C., being solid in said moldable material, and being melted in said drying step, so that 25-65% of said pore-forming material added is removed from said green body in said drying step, and
said ceramic honeycomb structure having an outer diameter of 150 mm or more and a length of 150 mm or more.

2. The method for producing a ceramic honeycomb structure according to claim 1, wherein said pore-forming material is a powdery polyalcohol fatty acid ester.

3. The method for producing a ceramic honeycomb structure according to claim 1, wherein said pore-forming material has a median diameter D50 of 10-200 μm, the value of the formula of (D90–D10)/D50, wherein D10 and D90 respectively represent the diameters of particles whose cumulative volumes (cumulative values of the volumes of particles up to particular diameters) correspond to 10% and 90% of the total volume of said particles, being 1-1.5; and wherein the amount of said pore-forming material added is more than 6% and 30% or less by mass, based on said ceramic material powder.

4. The method for producing a ceramic honeycomb structure according to claim 1, wherein said drying step is conducted with microwaves and/or hot air applied to said green body.

5. The method for producing a ceramic honeycomb structure according to claim 1, wherein the molten pore-forming material is removed by air blow in said drying step.

6. The method for producing a ceramic honeycomb structure according to claim 1, wherein said green body is subject to a centrifugal force to remove said molten pore-forming material during or after drying.

7. A method for producing a ceramic honeycomb structure having a large number of paths partitioned by porous cell walls, said cell walls having a thickness of 0.17-0.45 mm and porosity of 40% or more comprising the steps of
preparing a moldable material comprising a ceramic material powder, a binder, a pore-forming material and water;
extruding said moldable material to form a honeycomb-shaped green body; and
drying and sintering said green body,
said pore-forming material having a melting point of 40-110° C., being solid in said moldable material, and being melted in said drying step, so that 25% or more of said pore-forming material added is removed from said green body in said drying step,
wherein said green body is subject to a centrifugal force to remove said molten pore-forming material during or after drying.

* * * * *